(12) United States Patent
Kimori et al.

(10) Patent No.: US 7,316,285 B2
(45) Date of Patent: Jan. 8, 2008

(54) MOTORCYCLE

(75) Inventors: Akira Kimori, Shizuoka (JP); Naoki Okamoto, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 218 days.

(21) Appl. No.: 11/001,570

(22) Filed: Dec. 1, 2004

(65) Prior Publication Data
US 2005/0161271 A1 Jul. 28, 2005

(30) Foreign Application Priority Data
Dec. 2, 2003 (JP) .............................. 2003-403601

(51) Int. Cl.
*B62D 61/02* (2006.01)
*B62K 11/00* (2006.01)
*B62K 21/02* (2006.01)
(52) U.S. Cl. ...................... 180/219; 280/276; 280/279
(58) Field of Classification Search ................ 180/219, 180/220; 280/276, 279, 280, 281.1
See application file for complete search history.

(56) References Cited

U.S. PATENT DOCUMENTS

| 3,511,521 | A | * | 5/1970 | Gobini | ...................... 280/270 |
| 6,260,869 | B1 | * | 7/2001 | Hanlon et al. | .............. 280/276 |
| 6,688,274 | B2 | * | 2/2004 | Yokoyama et al. | ..... 123/198 E |
| 6,860,353 | B2 | * | 3/2005 | Miyashiro | ................... 180/227 |
| 2006/0113745 | A1 | * | 6/2006 | Lagar | ......................... 280/279 |

FOREIGN PATENT DOCUMENTS

| JP | 06-135370 | 5/1994 |
| JP | 11-115860 | 4/1999 |
| JP | 2003-040167 | 2/2003 |

\* cited by examiner

*Primary Examiner*—Lesley D. Morris
*Assistant Examiner*—Marc A. Scharich
(74) *Attorney, Agent, or Firm*—Hogan & Hartson LLP

(57) ABSTRACT

A motorcycle has a structure in which the head pipe and the front fork are offset, the offset of the front fork in the rear direction being greater than that of the head pipe. The front wheel diameter is greater than ½ of the wheelbase between the front and rear wheels, and the caster angle of the head pipe is in the range from 20° to 25°.

20 Claims, 3 Drawing Sheets

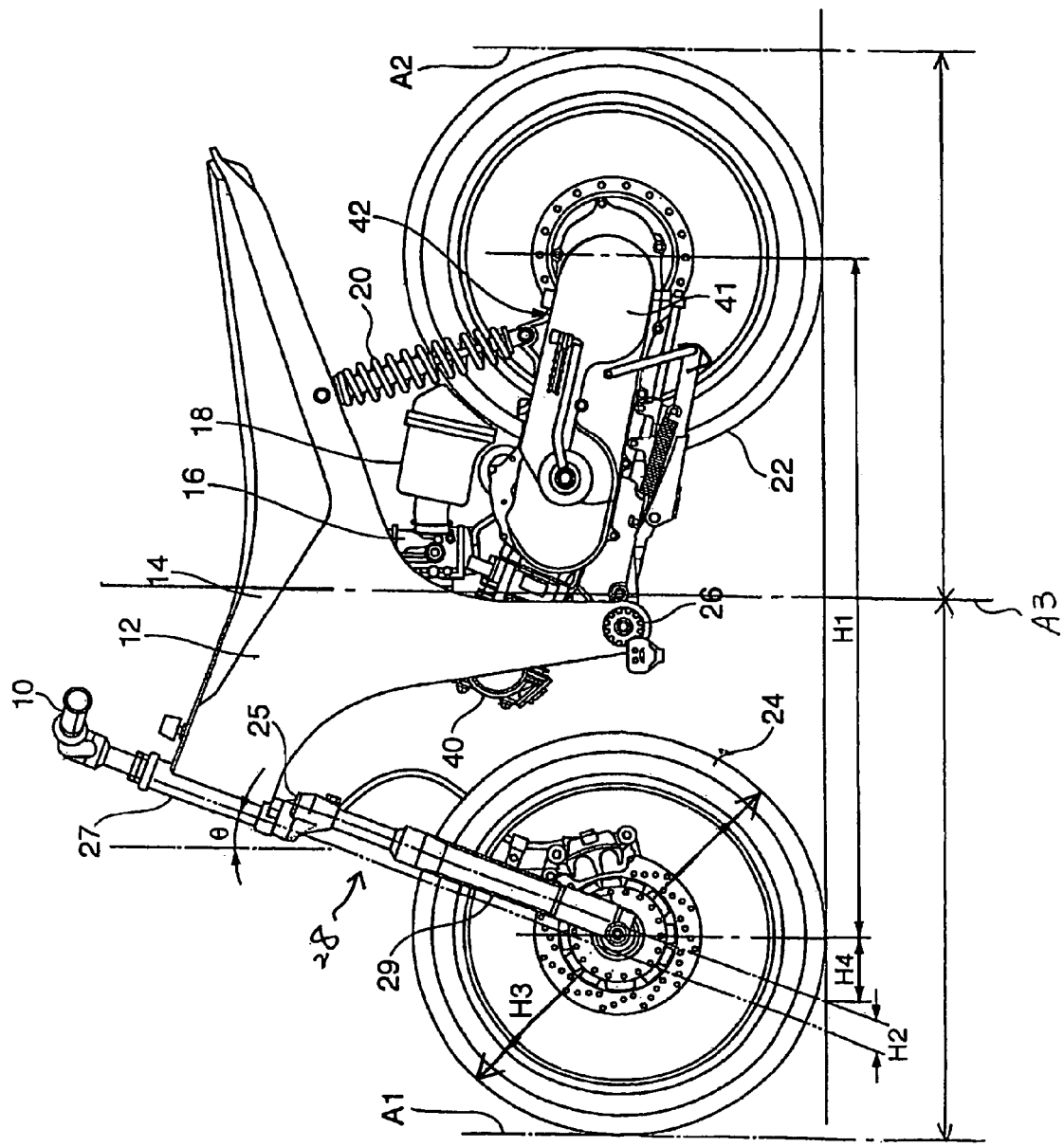
[FIG. 1]

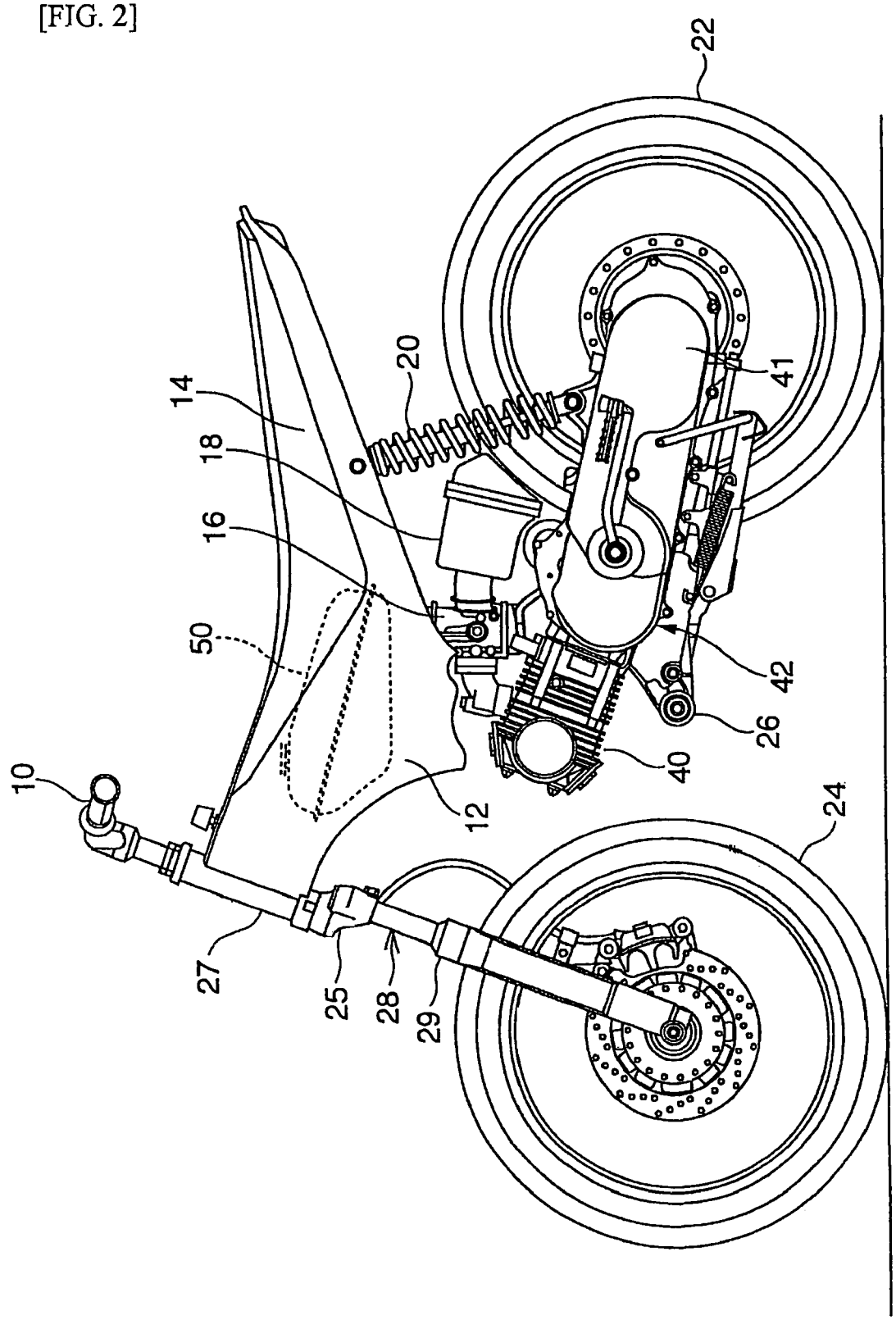
[FIG. 2]

[FIG. 3]
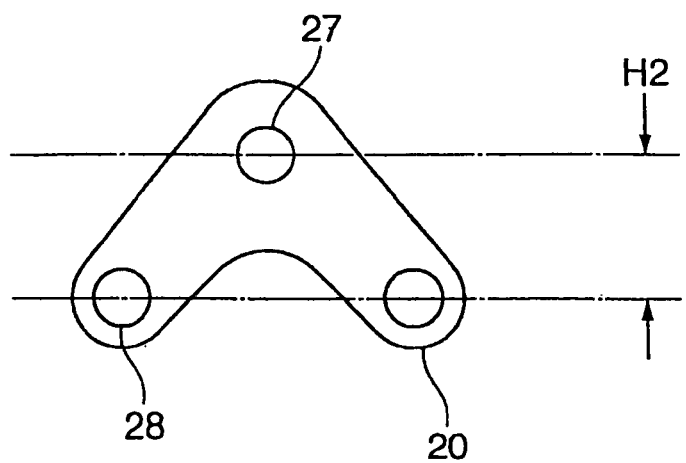
[FIG. 4]
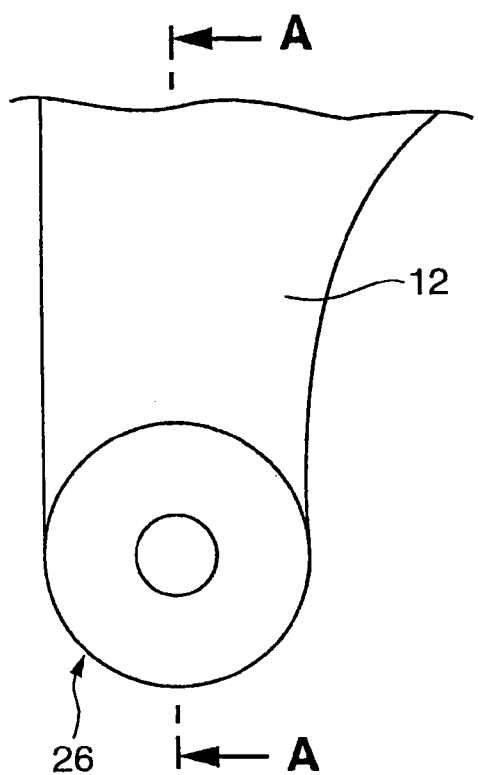
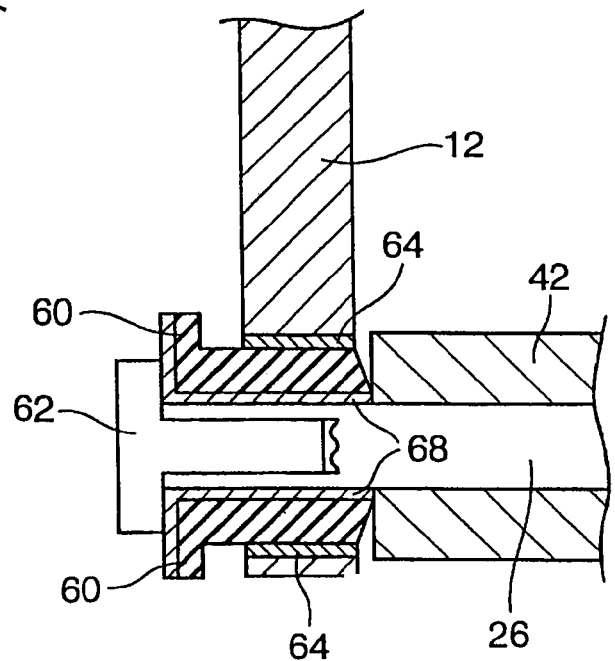

MOTORCYCLE

BACKGROUND OF THE INVENTION

1. Field of the Invention

The invention relates a motorcycle, and particularly to a motorcycle featuring overall compactness without sacrificing riding stability.

2. Related Background Art

A compact, electrically driven motor cycle is conventionally known as an example of such a motorcycle. In this example in the past, in order to provide an electrically driven motorcycle that not only is as compact and lightweight as possible, but also has a large space for holding a battery, this motorcycle has a motor serving as the drive source, a battery that is the electrical power source for the motor, a steering handlebar used to steer the front wheel, a foot rest disposed between the steering handlebar and a seat disposed over the rear wheel, a unitized body frame between the steering handlebar and the seat, which is bent in a U-shape therebelow and centered left-to-right, the body frame being disposed higher than the foot rest, and the battery being disposed beneath the foot rest, substantially centered about the foot rest left-to-right.

In a motorcycle of the past, along with making the body size small, there was room for improvement in the area of riding stability. Accordingly, an advantage of the present invention is to provide a motorcycle not only with a compact body, but also with no loss of riding stability or improved riding stability.

SUMMARY OF THE INVENTION

Upon making an active study aimed at achieving the above-noted advantage, the inventors learned that, by making the caster angle small and also making the wheelbase small while providing relative large wheels, it is possible to achieve a motorcycle that not only is superior in forward running and cornering, but also is compact. The present invention was made from that knowledge. Specifically, one aspect of the present invention is a motorcycle having a structure in which the head pipe and a lower portion of a front fork are disposed so as to be offset, wherein the lower portion of the front fork is offset in the rear direction more than the head pipe, and wherein the front wheel diameter is at least ½ of the wheelbase length between the front wheel and the rear wheel.

Another aspect of the present invention is a motorcycle having a structure in which the head pipe and the lower portion of the front fork are offset, wherein the lower portion of the front fork is offset in the rear direction more than the head pipe, and wherein the wheel diameter of the front wheel is at least 15 inches. It is preferable that the front wheel diameter be no greater than 17 inches.

Yet another aspect of the present invention is a motorcycle having a structure in which the head pipe and the lower portion of the front fork are offset, wherein the lower portion of the front fork is offset in the rear direction more than the head pipe, and wherein the front wheel diameter is at least ⅓ of the overall length of the motorcycle.

Another aspect of the present invention is a motorcycle having a structure in which the head pipe and the lower portion of the front fork are offset, wherein the lower portion of the front fork is offset in the rear direction more than the head pipe, and wherein the caster angle of the head pipe is 20° to 25°. When the caster angle is made 20°, it is preferable that the trail value (mm) obtained from the offset length (mm) and the caster angle (°) be at least 100 mm.

In the present invention, it is preferable that a unit-swing configuration be adopted, in which the drive unit is swingably held to the frame on a pivot shaft, the rear wheel being supported on the rear end of the drive unit, and the pivot shaft being positioned further to the rear than the center of the motorcycle in the front-to-rear direction. It is particularly preferable that the drive unit be supported by the body via rubber bushings.

According to the present invention, it is possible to provide a motorcycle not only with a compact body, but also with no loss of riding stability or improved riding stability.

BRIEF DESCRIPTION OF THE DRAWINGS

FIG. 1 is a side elevation view of a motorcycle according to an embodiment of the present invention.

FIG. 2 is a side elevation view of a motorcycle according to an embodiment of the present invention with the body frame cut away.

FIG. 3 is a plan view of an underbracket.

FIG. 4 is a drawing showing a side elevation view of a mechanism in which a unit swing mechanism is supported by the body frame.

DESCRIPTION OF THE PREFERRED EMBODIMENTS:

Embodiments of the present invention are described below in detail, with reference made to the accompanying drawings.

FIG. 1 shows a left side elevation of a motorcycle according to the present invention, and FIG. 2 shows a left side elevation with part of the body frame cut away. Reference numeral 40 denotes a single-cylinder 4-cycle engine, which is formed together with a transmission unit 41 having therewithin a V-belt type stepless transmission, so as to form the swing unit 42. The reference numeral 24 denotes the front wheel, and the front fork 28 supporting the front wheel is pivotally supported, so as to be swingable left and right, by a head pipe 27 disposed at the front end of the body frame 12 and the underbracket 25.

Seen from the side of the motorcycle (from the crankshaft direction), the body frame 12 is formed so as to be substantially bifurcated, with a seat 14 for the rider being disposed on one end side facing the fork. The other end extends in the downward direction of the vehicle, and a pivot shaft 26 is formed at the end thereof. The unit swing mechanism 42 is swingably supported onto the body frame 12 at the pivot shaft 26. The unit swing mechanism 42 supports the rear wheel 22, and also supports, via a damper 20, the body frame 12. Reference numeral 18 denotes an air intake, and 16 denotes a carburetor. Reference numeral 29 denotes a shock absorber for the front fork 28, 50 is a fuel tank, and 10 are handgrips, the position of which is established further rearward than an extension line from the steering shaft (heed pipe shaft), thereby improving the operation of the handlebar.

The overall length of the motorcycle (distance from A1 to A2 in FIG. 1), is 1.5 meters, and is preferably in a range about 1.5 meters. In order to implement a compact motorcycle such as this, a motorcycle according to this embodiment has the following features.

The motorcycle has one or more of the features that the wheel diameter (H3 in FIG. 1) of the front wheel is made to be at least ½ times the wheelbase (H1 in FIG. 1), the front wheel (or the front and rear wheels or the rear wheel) diameter is made at least ⅓ of the overall motorcycle length (distance between A1 and A2 in FIG. 1), the head pipe 27 (front fork 28) caster angle (θ in FIG. 1) is made in the range from 20° to 25°, the front fork 28 having the lower portion more offset in the rear direction than the head pipe 27, and the position of the pivot shaft 26 is set so as to be further forward than the center A3 in the motorcycle front-to-rear direction (which divides the length between A1 and A2 evenly in two).

In order to maintain or improve the motorcycle ridabiity while making the motorcycle compact, it is preferable that the wheel diameter H3 of the front wheel be selected in the range 15 to 17 inches, and that the offset H2 of the front fork 28 relative to the head pipe 27 be selected in the range 30 to 60 mm. FIG. 3 is a plan view of an underbracket 25 fixed to the head pipe 27, in which H2 shown in FIG. 2 corresponds to the offset between the head pipe 27 and the lower portion of the front fork 28.

In order to achieve a compact motorcycle, the wheelbase H1 was first made as small as possible, and in order to achieve sufficient space for the rider, caster angle θ of the head pipe was made as small as possible. In order to make the wheelbase H1 small, the lower portion of the front fork 28 was caused to be offset in the rear direction of the motorcycle more than the head pipe 27, and also the pivot shaft 26 supporting the unit swing mechanism was placed further to the front than the center A3 in the vehicle front-to-rear direction.

By making the caster angle θ small and making the wheelbase H1 small, the ridability of the motorcycle gives priority to turning performance over forward running stability. By providing a relatively large front wheel diameter (a wheel size H3 of at least 15 inches but not greater than 17 inches) and offsetting the lower portion of the front fork 28 further in the rear direction than the head pipe 27, and by making the caster angle θ of the head pipe 27 small while maintaining the trail length, the forward running stability of the motorcycle is improved. If the caster angle θ is made 20°, it is preferable that the trail length (H4 in FIG. 1) obtained from the offset H2 (mm) be at least 100 mm.

The unit swing mechanism of the motorcycle described herein is swingably supported onto the body frame 12 via a rubber bushing. For this reason, the anti-vibration performance is superior to a linking mechanism of the past, in addition to providing a cost advantage. FIG. 4 is an expanded view of the mounting mechanism using rubber bushings, wherein (1) is a side elevation of the end part of the body frame 12, and (2) is a side elevation in the direction of A-A shown in (1). The pivot shaft 26 passes through the engine case of the unit swing mechanism 42 and through the frame 12. The pivot shaft 26 is fitted through the body frame 12 via the T-shaped rubber bushing 60, the outer collar 64, and the inner collar 68. Reference numeral 62 is a bolt used to hold the shock-absorbing mechanism formed by the rubber bushing and the like to the shaft 26. The unit swing mechanism 42 rotates about the pivot shaft as the center. The swinging of the unit swing mechanism 42 is absorbed by the shock-absorbing mechanism, so as to minimize the amount of swinging that is transmitted to the body frame 12. Although the foregoing description is for the case of the front wheel, it will be understood that application is possible to the rear wheel as well.

What is claimed is:

1. A motorcycle, comprising:
   a head pipe and a front fork offset, in which a lower portion of the front fork is offset in a rear direction more than the head pipe,
   wherein a front wheel diameter is at least ⅓ of an overall length of the motorcycle, and
   wherein an offset length of the head pipe from the front fork is less than a trail length obtained from a caster angle θ of the head pipe and the offset length.

2. A motorcycle comprising:
   a head pipe and a front fork offset, in which a lower portion of the front fork is offset in a rear direction more than the head pipe,
   wherein a front wheel diameter is at least ½ of a wheelbase between the front wheel and a rear wheel, and
   wherein the lower portion of the front fork is offset from the head pipe in a range of 30 to 60 mm.

3. A motorcycle comprising:
   a head pipe and a front fork offset, in which a lower portion of the front fork is offset in a rear direction more than the head pipe,
   wherein a front wheel diameter is at least 15 inches, and
   wherein the lower portion of the front fork is offset from the head pipe in a range of 30 to 60 mm.

4. A motorcycle comprising:
   a head pipe and a front fork offset, in which a lower portion of the front fork is offset in a rear direction more than the head pipe,
   wherein a front wheel diameter is at least ⅓ of an overall length of the motorcycle, and
   wherein the lower portion of the front fork is offset from the head pipe in a range of 30 to 60 mm.

5. A motorcycle, comprising:
   a head pipe and a front fork offset, in which a lower portion of the front fork is offset in a rear direction more than the head pipe,
   wherein a front wheel diameter is at least ½ of a wheelbase between the front wheel and a rear wheel, and
   wherein an offset length of the head pipe from the front fork is less than a trail length obtained from a caster angle θ of the head pipe and the offset length.

6. The motorcycle according to claim 5, further comprising a single-cylinder 4-cycle engine.

7. A motorcycle, comprising:
   a head pipe and a front fork offset, in which a lower portion of the front fork is offset in a rear direction more than the head pipe,
   wherein a front wheel diameter is at least 15 inches, and
   wherein an offset length of the head pipe from the front fork is less than a trail length obtained from a caster angle θ of the head pipe and the offset length.

8. The motorcycle, according to claim 7, wherein the front wheel diameter is 17 inches or smaller.

9. A motorcycle, comprising:
   a head pipe and a front fork offset, in which a lower portion of the front fork is offset in a rear direction more than the head pipe,
   wherein a front wheel diameter is at least 15 inches, and a caster angle θ of the head pipe is in a range from 20° to 25°.

10. The motorcycle according to claim 9, wherein when the caster angle θ is 20°, a trail length (mm) obtained from an offset length (mm) and the caster angle θ is at least 100 mm.

11. The motorcycle according to claim 10, wherein a swing unit configuration is adopted, in which a drive unit is swingably held to a frame on a pivot axis, wherein a rear wheel is supported on a rear end of the drive unit, and wherein a pivot shaft is positioned further to the rear end than a center of the motorcycle in a front-to-rear direction.

12. The motorcycle according to claim 11, wherein the drive unit is supported by the motorcycle via a rubber bushing.

13. The motorcycle according to claim 12, wherein the rubber bushing has a T-shape.

14. A motorcycle, comprising:
a head pipe and a front fork offset, in which a lower portion of the front fork is offset in a rear direction more than the head pipe,
wherein a caster angle θ of the head pipe is in a range from 20° to 25°.

15. The motorcycle according to claim 14, wherein when the caster angle θ is 20°, a trail length (mm) obtained from an offset length (mm) and the caster angle θ is at least 100 mm.

16. The motorcycle according to claim 15, wherein a swing unit configuration is adopted, in which a drive unit is swingably held to a frame on a pivot axis, wherein a rear wheel is supported on a rear end of the drive unit, and wherein a pivot shaft is positioned further to the rear end than a center of the motorcycle in a front-to-rear direction.

17. The motorcycle according to claim 15, wherein a drive unit is supported by the motorcycle via a rubber bushing.

18. The motorcycle according to claim 15, wherein the lower portion of the front fork is offset from the head pipe in a range of 30 to 60 mm.

19. The motorcycle according to claim 17, wherein the rubber bushing has a T-shape.

20. The motorcycle, according to claim 14, wherein the lower portion of the front fork is offset from the head pipe in a range of 30 to 60 mm.

\* \* \* \* \*